US009231848B2

(12) United States Patent
Liu

(10) Patent No.: US 9,231,848 B2
(45) Date of Patent: Jan. 5, 2016

(54) METHOD AND SYSTEM FOR AN OVERLAY MANAGEMENT CONTROL NETWORK

(71) Applicant: FUTUREWEI TECHNOLOGIES, INC., Plano, TX (US)

(72) Inventor: Fangping Liu, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 110 days.

(21) Appl. No.: 14/083,072

(22) Filed: Nov. 18, 2013

(65) Prior Publication Data

US 2015/0139036 A1 May 21, 2015

(51) Int. Cl.
*H04L 12/751* (2013.01)
*H04L 12/24* (2006.01)
*H04L 29/08* (2006.01)
*H04L 12/715* (2013.01)
*H04L 12/56* (2006.01)

(52) U.S. Cl.
CPC ............ *H04L 45/02* (2013.01); *H04L 41/0886* (2013.01); *H04L 45/64* (2013.01); *H04L 69/322* (2013.01); *H04L 45/741* (2013.01)

(58) Field of Classification Search
None
See application file for complete search history.

(56) References Cited

U.S. PATENT DOCUMENTS

| | | | | |
|---|---|---|---|---|
| 7,916,723 | B2* | 3/2011 | Fan et al. | 370/389 |
| 2004/0151202 | A1* | 8/2004 | Mandavilli et al. | 370/463 |
| 2005/0270986 | A1* | 12/2005 | Watanabe et al. | 370/252 |
| 2009/0210523 | A1* | 8/2009 | Duggan | 709/223 |
| 2009/0316602 | A1* | 12/2009 | Nandy et al. | 370/254 |
| 2010/0177674 | A1* | 7/2010 | Aggarwal | 370/312 |
| 2012/0084406 | A1* | 4/2012 | Kumbalimutt | 709/220 |
| 2014/0269702 | A1* | 9/2014 | Moreno et al. | 370/390 |
| 2015/0109955 | A1* | 4/2015 | Wilkinson et al. | 370/254 |

* cited by examiner

*Primary Examiner* — Kerri Rose

(57) ABSTRACT

Embodiments of the present invention provide a novel solution that enables traditional network management services to be automated without requiring the standard user oversight often required by conventional networking systems. Embodiments of the present invention are operable to utilize in-band communications used by network devices within an existing Layer 2 network to automatically generate a virtualized Layer 2 management network. By using MAC address learning procedures and/or generating a logical convergence state for an existing physical Layer 2 network, embodiments of the present invention can generate a virtual layer 2 network interface that facilitates automatic network connectivity for new and/or existing network devices. As such, embodiments of the present invention can enable communication between various network layers (e.g., Layer 3/Layer 4 networks) that allows network devices to be bootstrapped to an existing network infrastructure in a manner that requires no configuration.

18 Claims, 9 Drawing Sheets

Exemplary Network Device 100

Exemplary Virtual Layer 2 Convergence Process of Network Nodes

| Forwarding Table 107-1 computed for Network Node 100-1 by Control Module 138-1 | | | | |
| --- | --- | --- | --- | --- |
| Type | MAC Destination Address | Nexthop | Interface | Interface Type |
| Internal | Network Node 100-1 MAC address | Local | CPU | Internal |
| Internal | Network Node 100-2 MAC address | Network Node 100-2 MAC address | Interface 101-1 | Internal |
|  |  | Network Node 100-2 MAC address | Interface 101-4 | Internal |
| Internal | Network Node 100-3 MAC address | Network Node 100-2 MAC address | Interface 101-1 | Internal |
|  |  | Network Node 100-2 MAC address | Interface 101-4 | Internal |

| Forwarding Table 107-2 computed for Network Node 100-2 by Control Module 138-2 | | | | |
| --- | --- | --- | --- | --- |
| Type | MAC Destination Address | Nexthop | Interface | Interface Type |
| Internal | Network Node 100-1 MAC address | Network Node 100-1 MAC address | Interface 101-1 | Internal |
|  |  | Network Node 100-1 MAC address | Interface 101-4 | Internal |
| Internal | Network Node 100-2 MAC address | Local | CPU | Internal |
| Internal | Network Node 100-3 MAC address | Network Node 100-3 MAC address | Interface 101-2 | Internal |
|  |  | Network Node 100-3 MAC address | Interface 101-3 | Internal |

| Forwarding Table 107-3 computed for Network Node 100-3 by Control Module 138-3 | | | | |
| --- | --- | --- | --- | --- |
| Type | MAC Destination Address | Nexthop | Interface | Interface Type |
| Internal | Network Node 100-1 MAC address | Network Node 100-2 MAC address | Interface 101-2 | Internal |
|  |  | Network Node 100-2 MAC address | Interface 101-3 | Internal |
| Internal | Network Node 100-2 MAC address | Network Node 100-2 MAC address | Interface 101-2 | Internal |
|  |  | Network Node 100-2 MAC address | Interface 101-3 | Internal |
| Internal | Network Node 100-3 MAC address | Local | CPU | Internal |

Exemplary Unicast Forwarding Tables Computed by Control Modules of Network Nodes

Figure 2B

Exemplary Multicast Forwarding Tables Computations Performed by Network Nodes

Exemplary Automated Virtual Layer 2 Interface Generation Process

| Forwarding Table 107-1 computed for Network Node 100-1 by Control Module 138-1 | | | | |
|---|---|---|---|---|
| Type | Destination MAC Address | Nexthop | Interface | Interface Type |
| Internal | Network Node 100-1 MAC address | Local | CPU | Internal |
| Internal | Network Node 100-2 MAC address | Network Node 100-2 MAC address<br>Network Node 100-2 MAC address | Interface 101-1<br>Interface 101-4 | Internal<br>Internal |
| Internal | Network Node 100-3 MAC address | Network Node 100-2 MAC address<br>Network Node 100-2 MAC address | Interface 101-1<br>Interface 101-4 | Internal<br>Internal |
| External | External Device 104 MAC Address | * | Interface 101-5 | External |

| Forwarding Table 107-2 computed for Network Node 100-2 by Control Module 138-2 | | | | |
|---|---|---|---|---|
| Type | Destination MAC Address | Nexthop | Interface | Interface Type |
| Internal | Network Node 100-1 MAC address | Network Node 100-1 MAC address<br>Network Node 100-1 MAC address | Interface 101-1<br>Interface 101-4 | Internal<br>Internal |
| Internal | Network Node 100-2 MAC address | Local | CPU | Internal |
| Internal | Network Node 100-3 MAC address | Network Node 100-3 MAC address<br>Network Node 100-3 MAC address | Interface 101-2<br>Interface 101-3 | Internal<br>Internal |
| External | External Device 104 MAC Address | * | Interface 101-5 | External |

| Forwarding Table 107-3 computed for Network Node 100-3 by Control Module 138-3 | | | | |
|---|---|---|---|---|
| | Destination MAC Address | Nexthop | Interface | Interface Type |
| Internal | Network Node 100-1 MAC address | Network Node 100-2 MAC address<br>Network Node 100-2 MAC address | Interface 101-2<br>Interface 101-3 | Internal<br>Internal |
| Internal | Network Node 100-2 MAC address | Network Node 100-2 MAC address<br>Network Node 100-2 MAC address | Interface 101-2<br>Interface 101-3 | Internal<br>Internal |
| Internal | Network Node 100-3 MAC address | Local | CPU | Internal |
| External | External Device 104 MAC Address | * | Interface 101-5 | External |

Figure 2E

Exemplary Virtual Layer 2 Convergence Process

Exemplary Virtual Layer 2 Service Request Generation Process Responsive to a Virtual Layer 2 Convergence State
(Operation 510 of Figure 3)

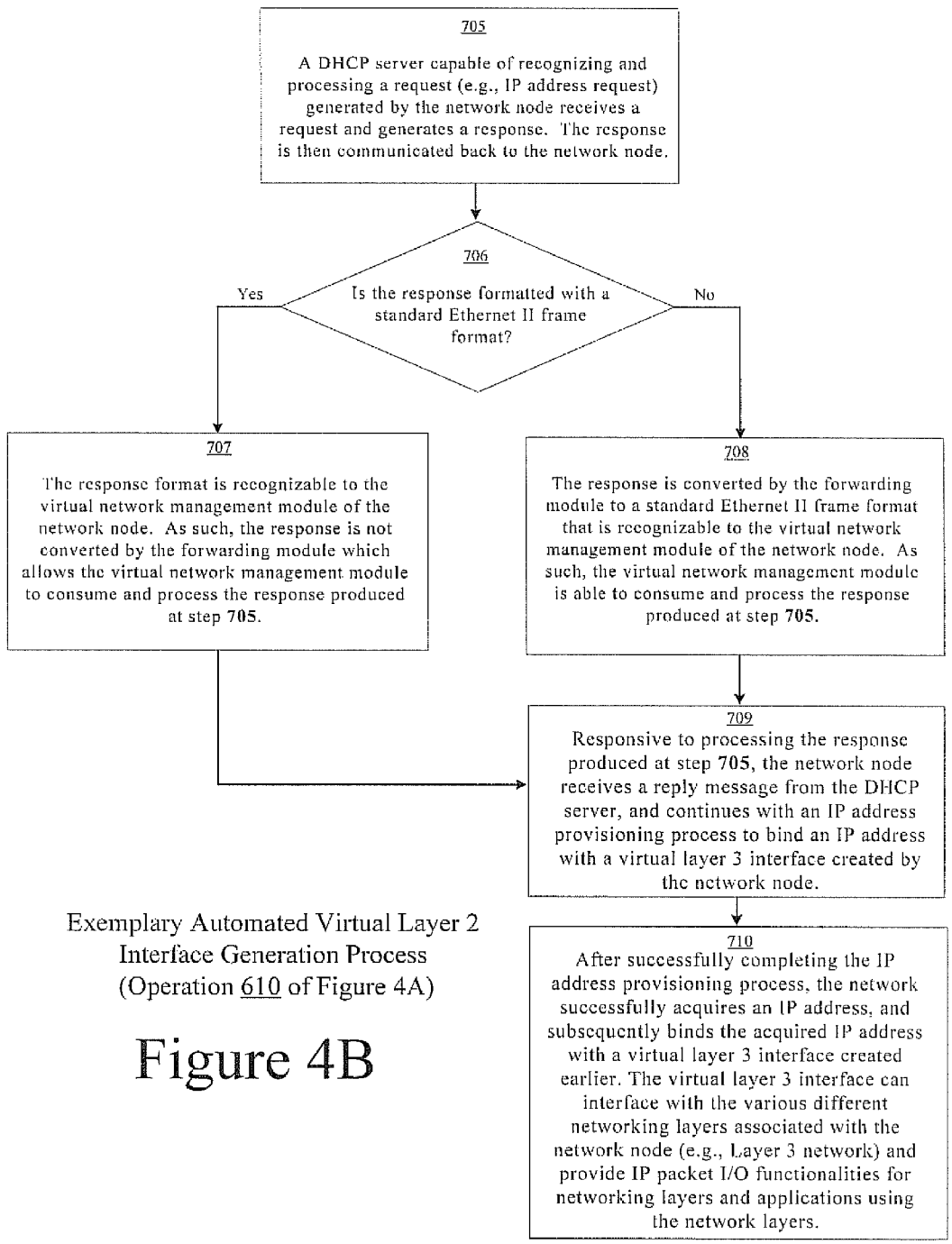

METHOD AND SYSTEM FOR AN OVERLAY MANAGEMENT CONTROL NETWORK

FIELD OF THE INVENTION

Embodiments of the present invention are generally related to the field of computer networking.

BACKGROUND OF THE INVENTION

In utilizing cloud computing technology, companies often employ the use of multiple data centers which provide the computational resources required for companies to meet the needs of their customers. Data centers can host a number of different network devices (i.e., servers, network switches, etc.) and are used to provide different forms of media and/or offer vast amounts of storage space to customers. However, as user demand for media and/or storage increases, companies need to correspondingly increase the computing capacity of their data centers. Thus, companies need to increase the number of network devices within their data centers.

However, when acquiring new network devices for these data centers, companies are often required to manually install and manage these devices. For instance, the management ports of each network device must be manually provisioned and manually configured by an experienced end-user (i.e., a network administrator). This is done to ensure that these network devices, as well as the networks in which these devices are placed within, properly function in an expected manner. As such, the process of planning, wiring, configuring and managing a network is a cumbersome task for a company and requires significant oversight. Accordingly, these companies are forced to spend a significant amount of time, money and computing power to effectively manage existing network infrastructures within their data centers. This imposes a huge toll on companies since this is not their primary aspect of business.

SUMMARY OF THE INVENTION

Accordingly, a need exists for a solution that enables users to effectively and efficiently manage a given network infrastructure without requiring a significant amount of user oversight or capital. Embodiments of the present invention provide a novel solution that enables traditional network management services to be automated without requiring the standard user oversight often required by conventional networking systems. Embodiments of the present invention are operable to utilize in-band communications used by network devices within an existing Layer 2 network to automatically generate a virtualized Layer 2 management network. By using MAC address learning procedures and/or generating a logical convergence state for an existing physical Layer 2 network, embodiments of the present invention can generate a virtual layer 2 network interface that facilitates automatic network connectivity for new and/or existing network devices. As such, embodiments of the present invention can enable communication between various network layers (e.g., Layer 3/Layer 4 networks) that allows network devices to be bootstrapped to an existing network infrastructure in a manner that requires no configuration.

Embodiments of the present invention can be operable to provide a virtualized management network (or "control network") that can be capable of performing various functions that are commonly associated with a traditional management network. As such, embodiments of the present invention can be capable of processing various network device requests such as requests for a new IP address, SSH service requests, SNMP service requests, and the like. In this manner, embodiments of the present invention can be capable of providing provisioning services to new network devices which can include standard network services and/or application stacks that are commonly installed on a new network device when being placed in an existing network infrastructure.

Embodiments of the present invention can also be capable of learning the topology of a given network. As such, embodiments of the present invention are not dependent nor require the use of any other technology. Additionally, embodiments of the present invention can be used to provision and bootstrap new network devices in an automated manner which can help facilitate and extend the "plug and play" capabilities of a given network. As such, the virtual network management module can be fully functional upon initializing of a network device and require no configuration.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 2B depicts exemplary unicast MAC address forwarding tables computed for layer 2 network nodes during a virtual layer 2 convergence state in accordance with embodiments of the present invention.

FIG. 2E depicts exemplary forwarding tables computed for layer 2 network nodes subsequent to a virtual layer 2 convergence state in accordance with embodiments of the present invention.

FIG. 4B shows another flowchart of an exemplary computer controlled process for generating a virtual layer 2 interface responsive to a virtual layer 2 convergence state in accordance with embodiments of the present invention.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which can be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure can be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIGS. 3, 4A, 4B, etc.) describing the operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a combination of hardware and software, software, or software in execution. For example, a module can be, but is not limited to being, a process running on a processor, an integrated circuit, a subject, an executable, a thread of execution, a program, and or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon.

Exemplary Network Device for Generating a Virtual Layer 2 Interface

Figure 1:
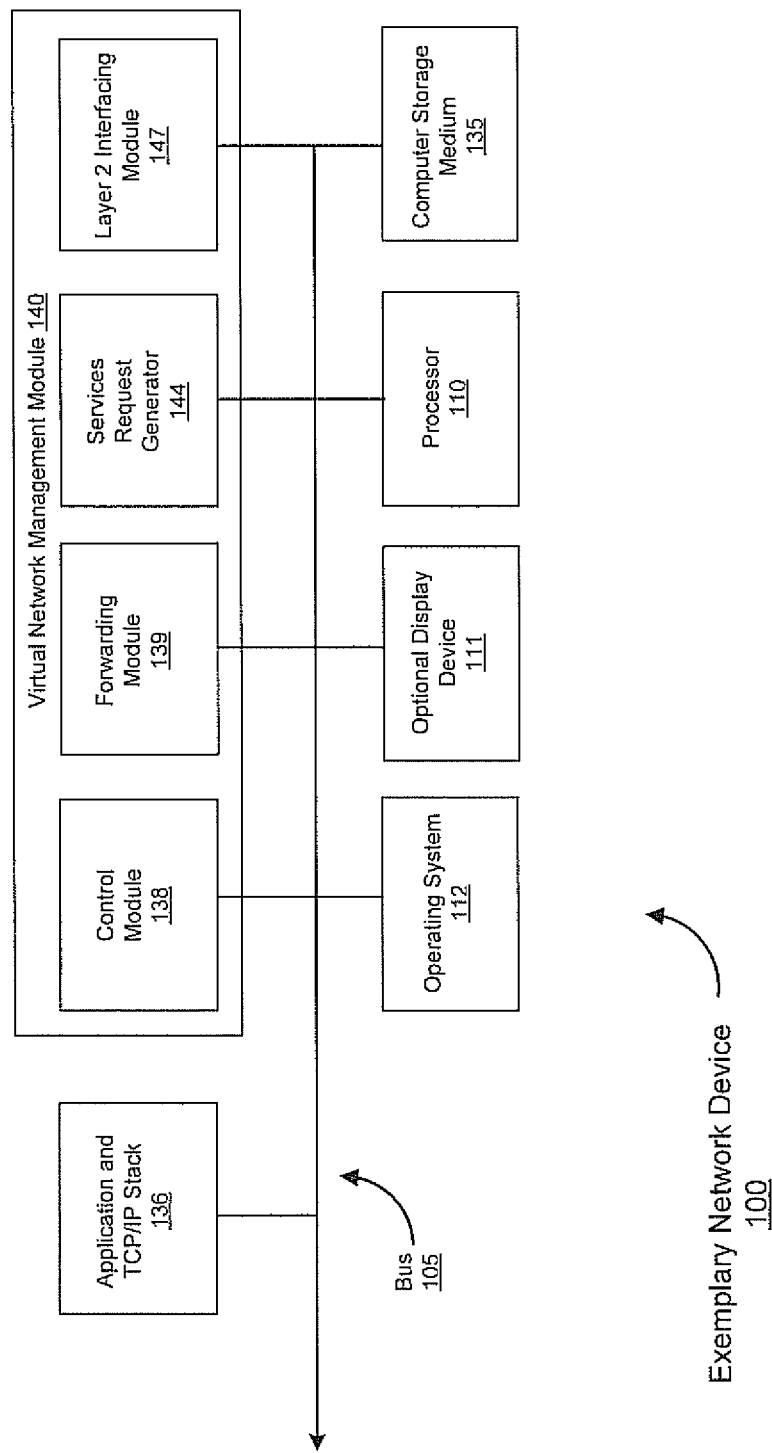
FIG. 1 is a block diagram of an exemplary network device for overlay management of a control network system in accordance with embodiments of the present invention.

FIG. 1 illustrates exemplary components used by various embodiments of the present invention. Although specific components are disclosed in network device 100, it should be appreciated that such components are exemplary. That is, embodiments of the present invention are well suited to having various other components or variations of the components recited in network device 100. It is appreciated that the components in network device 100 can operate with other components than those presented, and that not all of the components of system 100 can be required to achieve the goals of network device 100.

FIG. 1 shows a block diagram of a network device (e.g., network device 100) and corresponding modules. Network device 100 can be implemented as a Layer 2 network device (e.g., device used within the "Data Link Layer" of Open System Interconnection Model). As such, network device 100 can be a device capable of working with MAC addresses at the Layer 2 level which can include, but it not limited to, network interface cards (NICs), hubs, bridges, network switches, routers, and the like.

In its most basic configuration, network device 100 can comprise computer storage medium 135, processor 110, optional display device 111, operating system 112, virtual network management module 140, and application and TCP/IP stack 136. Depending on the exact configuration and type of network device, computer readable storage medium 135 can be volatile (such as RAM), non-volatile (such as ROM, flash memory, etc.) or some combination of the two. Portions of computer readable storage medium 135 when executed facilitate efficient execution of memory operations or requests for groups of threads.

Computer readable storage medium 135 can be used to store operating system 112, which can be loaded into processor 110 when network device 100 is initialized. Processor 110 executes instructions for network device 100 and for virtually managing network activity in an automated manner. Operating system 112 can be executed on processor 110; in some embodiments, operating system 112 supplies a programmatic interface to network device 100.

According to one embodiment, virtual network management module 140 can be implemented as hardware, software, or combination thereof within network device 100. Computer readable storage medium 135 can be used to store virtual network management module 140. Virtual network management module 140 can include control module 138, forwarding module 139, services request generator 144 and layer 3 interfacing module 147.

Control module 138 includes the functionality to dynamically gather network topology information concerning a given physical data network layer (e.g., Layer 2 network) based on interactions with other network devices. Upon initialization of network device 100 (e.g., powering on network device 100), control module 138 includes the functionality to periodically detect neighboring network devices that are members of network device 100's physical data layer network (e.g., neighboring network devices within the same autonomous networking system) using interior network reachability protocols. For instance, responsive to a detection of a neighboring network device within the same physical data layer network, control module 138 can be configured to exchange "hello" messages with the device using a network protocol such as IS-IS, etc.

In this manner, adjacent network devices can establish a neighboring relationship through successful exchanges of hello messages. Information included within hello messages can include, but is not limited to, network system IDs, multicast tree root election priority, etc. The system ID can optionally choose burned-in addresses or "BIA" MAC addresses of the network device, and can be used for routing purposes. The multicast tree root election priority can be used to elect a tree root which is used to compute multicast distribution tree for multicast and broadcast frames.

Adjacent network devices with neighboring relationships can exchange Link State Advertisement PDUs ("LSA" information). LSA information communicated between the two network nodes can include routing information learned by each network device. For example, control module 138 can learn information which may include, but is not limited to, virtual MAC addresses, system IDs, multicast distribution tree root election priority determination of all networking devices within the same physical data network layer as network device 100 (e.g., same autonomous networking system), etc. Also, LSA information exchanged between network device 100 and a neighboring network device within the same physical data network layer can also include any external MAC addresses learned by the two network devices separately during a previous exchange of LSA information performed with other members and/or non-member network devices.

Accordingly, network devices within the physical data layer network, including network device 100, can periodically exchange updated information concerning any topological changes within the same autonomous network system (e.g., addition of new network devices, removal of network devices, etc.) in a manner that enables the physical data network layer to reach a "Layer 2 Convergence" state. Upon reaching this convergence state, each network device can obtain complete knowledge of the network routing topology of the same physical data network layer, thus generating a virtualized network (e.g., "virtual layer 2 network"). In one embodiment, virtual MAC addresses learned through LSA information exchanges can be used to forward layer 2 frames within the virtualized network as well as exchange layer 2 frames with devices outside the network.

Additionally, control module 138 includes the functionality to classify qualified interfaces (e.g., ports enabling communication with a neighboring network device) within the virtual network context during communications with neighboring network devices. In one embodiment, qualified interfaces can include, but are not limited to, physical ports, logical ports, virtual ports, etc. Qualified interfaces used to successfully exchange hello messages with a neighboring network device can be classified as an "internal interface" by control module 138 (e.g., successful hello exchanges with a neighboring network device within network device 100's physical data network layer).

Also, qualified interfaces used during attempts to exchange hello messages that were unsuccessful can be classified as an "external interface" by control module 138 (e.g., unsuccessful hello exchanges with a neighboring network device outside of network device 100's physical data network layer). For instance, upon initialization of network device 100, control module 138 can be configured to detect neighboring network devices that are not members of network device 100's physical data network layer (e.g., neighboring network devices associated with other autonomous networking systems). As such, interfaces connecting a node within network device 100's physical data network layer and a device outside this network can be designated as "external" interfaces by control module 138. In this manner, when an Ethernet frame destined to a node within the virtualized network is received on an external interface by network device 100, the source MAC address of the frame is checked by network node 100. If it is a MAC address unknown to network device 100, it can be classified as a new external MAC address by control module 138. As such, the new external MAC address can be advertised to all of network device 100's neighboring nodes within the physical data network layer and, hence, indirectly to all nodes within network device 100's virtual network.

Control module 138 can be configured to generate and/or update control routing tables for use in performing unicast, multicast and/or broadcast routing operations. For instance, control module 138 includes the functionality to generate and/or update a unicast, multicast and/or broadcast control routing table responsive to learning MAC addresses associated with an agreed root node during a LSA information exchange and/or peering session with a neighboring network device Control routing tables storing data for performing unicast, multicast and/or broadcast routing operations can be integrated into one table or placed in separate tables.

Additionally, control module 138 includes the functionality to generate and/or update a control routing table responsive to MAC addresses learned by network device 100 independently and/or during a LSA information exchange and/or a peering session with a neighboring network device. As such, upon physical data network layer reaching a convergence state, control module 138 can be configured to generate and/or update a unicast MAC address control routing table in a manner that leverages control module 138's complete knowledge of the network routing topology associated physical data network layer. Control routing tables can be stored in a data structure or within memory resident on network device 100 (e.g., computer readable storage medium 135). Also, control module 138 includes the functionality to generate and/or update a control routing table to include internal or external interface classifications associated with MAC addresses learned by control module 138.

Furthermore, control module 138 includes the functionality to generate and/or update a corresponding multicast and/or broadcast forwarding table for use by other components within network device 100 (e.g., forwarding module 139) using data stored within control routing tables. The forwarding table can be separate from the control routing table and stored separately in memory resident on network device 100 (e.g., computer readable storage medium 135). The multicast and/or broadcast forwarding tables can be computed in a manner that leverages control module 138's complete knowledge of the network routing topology associated physical data network layer. Using a control protocol, control module 138 can exchange multicast distribution tree root election priority and, based on the priorities of all network nodes, a root is elected. Thus, the virtual network can use one single tree to distribute traffic for all multicast and broadcast traffic. The tree can be computed based on the elected tree root and topology information learned through LSA information exchanges. This single distribution tree is a bidirectional tree which allows traffic to flow downwards as well as upwards the tree. As such, the need for multicast routing protocols can be eliminated as well as the need for multiple distributions trees for multicast MAC addresses associated with various different IP multicast groups.

Additionally, control module 138 can be configured to filter external MAC addresses included within the headers of a frame during MAC address learning procedures and correspondingly update routing and/or forwarding tables created. For instance, when a frame is received via an external interface, the source MAC address and destination MAC address are both examined for MAC address learning purposes by control module 138. As such, if the source MAC address is not a unicast MAC address, control module 138 can be configured to ignore (e.g., not learn) the MAC address. Additionally, if the destination MAC address is a broadcast MAC address, control module 138 can be configured to ignore the source MAC address. In this manner, control module 138 can be configured to learn MAC address meant only for the virtual network.

Also, if the destination MAC address is a unicast MAC address that does not exist in the unicast forwarding table, then the source MAC address may not be learned by control module 138. As such, control module 138 can be configured to ignore unwanted MAC addresses from outside the virtual network. If the destination MAC address exists in a unicast forwarding table, then the source MAC address is examined by control module 138. If the source MAC address exists in the unicast forwarding table, then its age is reset to 0; if the source MAC address does not exist in the unicast forwarding table, then this is determined to be a new external MAC address by control module 138 and the MAC address is inserted to the unicast forwarding table with its age set to 0.

If the destination MAC address is a multicast MAC address, and there is no entry in the multicast forwarding table whose key is the same as this MAC address with 48 bit mask (an exact match), then the source MAC address is not learned. As such, control module 138 can be configured to ignore unwanted MAC addresses from outside the virtual network. However, if there is an exact match entry in the multicast forwarding table, then the source MAC address is examined by control module 138. If the source MAC address exists in the unicast forwarding table, then its age is reset to 0; if the source MAC address does not exist in the unicast forwarding table, then this is determined to be a new external MAC address by control module 138 and the MAC address is inserted to the unicast forwarding table with its age set to 0.

In this manner, MAC addresses learned by control module 138 can be aged out when its age reaches a max-age, which can be pre-determined value. Therefore, when control module 138 determines that a MAC address has aged out, control module 138 may be capable of notifying neighboring network devices so that they may also update their respective topology databases. For example, when control module 138 is notified about a newly learned MAC address, it creates LSA information about this MAC address, the interface form which this MAC address is learned, and installs the LSA information within its routing topology database and also sends to all network devices within the virtual network. Upon receipt of this LSA information from network node 100 informing them of new changes within the topology, other network devices within network node 100's virtual network can subsequently perform new routing computations and hence generate a unicast forwarding entry about this MAC address and install it in their respective unicast forwarding tables.

In this manner, all network devices within the virtual network can learn the new MAC address. Therefore, when the control module of a network device is notified about a MAC address being aged out, it can purge the LSA it created earlier about this MAC address from the whole virtual network. As such, other network devices within the network can subsequently perform a new routing computation which withdraws the unicast forwarding entry associated with the MAC address being aged out. In this manner, the MAC address can be aged out on all network devices within the virtual network.

Forwarding module 139 includes the functionality to parse frame and/or packet headers (e.g., data network PDUs associated with the physical data network layer) and read source MAC addresses and/or destination MAC addresses included within incoming frames and/or packets received by network device 100 on an inbound interface (e.g., internal and/or external interface). Forwarding module 139 includes the functionality to perform table lookup procedures which match entries within a forwarding table generated and/or updated by control module 138 (e.g., including any separate unicast tables, multicast tables, broadcast tables, etc.) with various fields within packet and/or frame headers. In this manner, forwarding module 139 can be configured to forward frames and/or packets received on an inbound interface responsive to detected matches between a MAC address stored within the forwarding table and a destination MAC addresses specified within an incoming frame or packet.

For instance, forwarding module 139 includes the functionality to recognize Layer 2 unicast frames and/or packets received through an inbound interface and correspondingly perform a table lookup procedure using their destination MAC addresses as the key. As such, if a destination MAC address is not found within the forwarding table during a table lookup performed, the frame can be discarded. Additionally, forwarding module 139 includes the functionality to recognize Layer 2 multicast/broadcast frames and/or packets received through an inbound interface and correspondingly perform a table lookup procedure using their destination MAC addresses as the key. As such, if a destination MAC address is not found within the forwarding table during a table lookup performed, the frame can be discarded.

Furthermore, forwarding module 139 includes the functionality to recognize internal and external destination MAC address specified within inbound frames received. As such, forwarding module 139 includes the functionality to convert inbound frames received from an internal interface format (e.g., format recognizable to an application executed on network device 100 and/or another neighboring network device) to an external interface format (e.g., conventional frame format recognizable to conventional network devices) and vice-versa prior to the performance of forwarding procedures. Forwarding module 139 includes the functionality to generate and/or update header information included within frames received by network device 100 (e.g., "destination" MAC address fields, "source" MAC address fields, etc.).

Additionally, forwarding module 139 includes the functionality to determine an egress port (e.g., relative ports within a group of interfaces connecting two network nodes) through the performance of hash calculations. Source MAC addresses and/or destination MAC addresses, including any layer 3 packet header fields, can be used as inputs for hash calculations. Also, forwarding module 139 includes the functionality to adjust the hop count of an inbound frame (e.g., increment hop count values, decrement hop count values, set hop count values to a maximum and/or minimum value, etc.).

Services request generator 144 includes the functionality to receive user-level data packets generated within a logical "services" layer (e.g., Layer 3, Layer 4, etc.) and generate a corresponding control network PDU (e.g., a "service request" or "request") that can be consumed by modules similar to virtual network management module 140 residing on a network device. Services request generator 144 includes the functionality to generate and/or update control network PDU header information included within an issued control network PDU (e.g., "destination" MAC address fields, "source" MAC address fields, etc.). Additionally, control network PDUs generated by services request generator 144 can also be configured to be broadcasted over a native VLAN port (e.g., trunk) associated with the physical data network layer through both internal and external interfaces learned by network node 100 during LSA information exchanges and/or peering sessions performed with neighbor network devices. Control network PDUs can be communicated over internal and/or external interfaces determined by control module 138.

Services request generator 144 includes the functionality to convert control network PDUs to an internal interface format for broadcasts communicated via internal interfaces so that they can be recognizable to network devices within the same physical data network layer as network device 100. Services request generator 144 includes the functionality to convert control network PDUs to a conventional frame format (e.g., Ethernet II frame format) for broadcasts communicated via external interfaces so that can be recognizable to network devices outside of the physical data network layer that includes network device 100.

Layer 3 interfacing module 147 includes the functionality to handle packet I/O for various layer 3/4 protocols (e.g., packets received from application TCP/IP stack 136). Layer 3 interfacing module 147 can create a virtual interface to handle packet I/O for all protocol modules at layer 3 and up. This layer 3 virtual interface is serviced by all internal and external layer 2 interfaces on network device 100; when transmitting a packet outbound, the actual outgoing interface to use depends on the destination MAC lookup results. As such, layer 3 interfacing module 147 includes the functionality to vertically communicate control network PDUs received by network device 100 to other network layers (e.g., Layer 3 network layer). For instance, layer 3 interfacing module 147 includes the functionality to receive data packets and transmit API data. Additionally, layer 3 interfacing module 147 includes the functionality to perform procedures to acquire an IP address for a layer 3 interface, etc.

Furthermore, network device 100 can also include optional display device 111 which can include the functionality to render output. Examples of optional display device 111 can include, but are not limited to, a liquid crystal display (LCD), a plasma display, cathode ray tube (CRT) monitor, etc. Network device 100 can also include optional input device(s) (not pictured) such as a touch screen (e.g., capacitive touch screen), keyboard, mouse, pen, voice input device, touch input device, etc. Network device 100 can further include a power source (e.g., battery) (not shown) operable to allow network device 100 to be movable and mobile while operating.

Exemplary Method for Generating a Virtual Layer 2 Interface

Figure 2A:
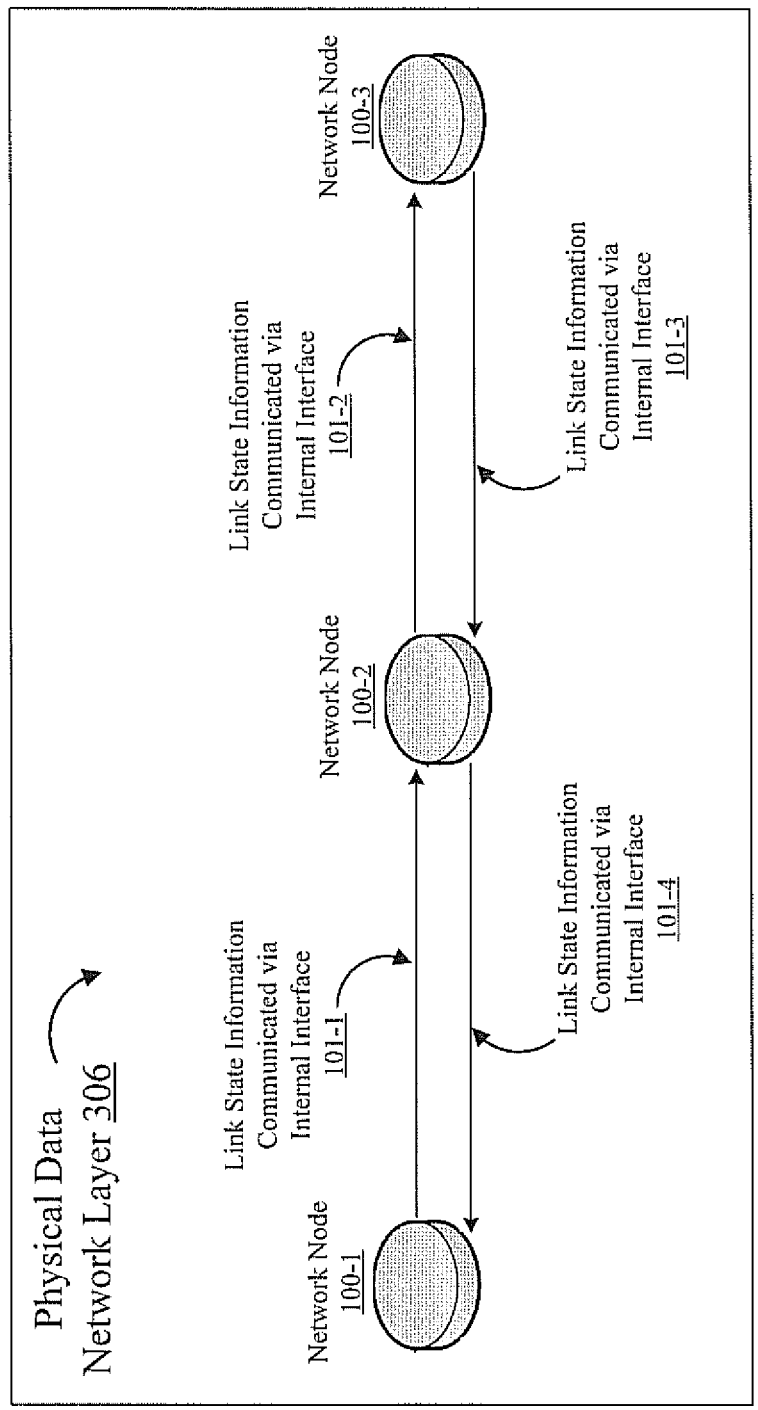
FIG. 2A depicts an exemplary virtual layer 2 convergence process in accordance with embodiments of the present invention.

FIG. 2A depicts an exemplary virtual Layer 2 convergence process performed in accordance with embodiments of the present invention. As illustrated in FIG. 2A, upon initialization, network nodes 100-1, 100-2, 100-3 can periodically attempt to detect neighboring nodes using network routing protocols on Ethernet links using their respective control modules (e.g., control module 138).

For instance, network node 100-1 can communicate signals within physical data network layer 306 using a conventional network routing protocol and detect the presence of its neighbor, network node 100-2, which responds to the signals sent by network node 100-1. Responsive to this detection, each network node's respective control module can communicate LSA information with each other. As described herein, LSA information communicated between the two network nodes can include routing information associated each respective network node (e.g., each network node's System ID, tree root election priority, virtual MAC address, etc.).

Additionally, network nodes 100-1 and 100-2 can also determine whether qualified interfaces used to communicate with each other are internal interfaces or external interfaces. For instance, in one example, qualified interfaces used by network nodes 100-1 and 100-2 during successful exchanges and/or receipt of hello messages can be classified as "internal interfaces" by the respective control modules of each network node. Also, qualified interfaces used by network nodes 100-1 and/or 100-2 during unsuccessful exchanges and/or receipt of hello messages can be classified as "external interfaces" by their respective control modules.

Using a process similar to the one described supra, network node 100-2 can discover network node 100-3 and engage in the exchange of LSA information with network node 100-3. LSA information communicated between network node 100-2 and network node 100-3 can include routing information associated with each respective network node (e.g., each network node's system ID, tree root election priority, and virtual MAC address). Additionally, network node 100-2 can also communicate network node 100-1's routing information, which was learned during the previous LSA information exchange session performed with network node 100-1. Furthermore, during a subsequent LSA information exchange session between network nodes 100-1 and 100-2, network node 100-2 can communicate network node 100-3's routing information to network node 100-1, which was learned during the previous LSA exchange session performed with network node 100-3.

Although FIG. 2A depicts 3 network nodes, embodiments of the present invention can support network configurations which can include more or less network nodes. Additionally, although FIG. 2A depicts physical data network layer 306 as implementing a bus network topology, embodiments of the present invention are not limited as such and can be implemented within a plurality of different network topologies (e.g., star, ring, mesh topologies, etc.)

FIG. 2B depicts exemplary unicast MAC address (or simply called "unicast") forwarding tables computed in accordance with embodiments of the present invention. As described herein, the control modules of network nodes 100-1, 100-2 and 100-3 (e.g., control modules 138-1, 138-2, 138-3) can each generate and/or update local control routing topology databases responsive to determinations learned by their respective network node during LSA information exchanges and/or peering sessions performed with neighboring network nodes. As such, using the control routing topology database computed for their respective network nodes, control modules 138-1, 138-2, and 138-3 can each compute a corresponding unicast forwarding table (e.g., forwarding tables 107-1, 107-2 and 107-3) for use when processing inbound frames received by network nodes 100-1, 100-2 and 100-3, respectively.

For example, forwarding table 107-1 can be generated and/or update by control module 138-1 for network node 100-1 during LSA information exchange sessions with network node 100-2. As such, control module 138-1 can store virtual MAC addresses learned for network node 100-2. Additionally, control module 138-1 can also store the interfaces learned for network node 100-2 during LSA information exchange sessions and/or peering operations performed. For instance, control module 138-1 can learn to associate interfaces 101-1 and 101-4 with network node 100-2. Additionally, in one embodiment, control module 138-1 can learn interface classifications made by network node 100-2.

Additionally, as illustrated in FIG. 2B, forwarding table 107-1 can further include virtual MAC addresses and/or interfaces learned by network node 100-2 during a separate LSA information exchange performed with other network nodes (e.g., network node 100-3). As such, control module 138-1 can also learn and store a virtual MAC address for network node 100-3. Additionally, control module 138-1 can also include interfaces and/or interface types associated with network node 100-3 as learned by network node 100-2 during LSA information exchanges performed with network node 100-3. For instance, control module 138-1 can learn to associate interfaces 101-1 and 101-4 with network node 100-3. Accordingly, in a similar manner, forwarding tables 107-2 and 107-3 can each be separately computed by control modules 138-2 and 138-3 for network nodes 100-2 and 100-3, respectively.

Furthermore, FIG. 2B can illustrate how network nodes 100-1, 100-2 and/or 100-3 can use their respective unicast forwarding tables to communicate data network PDUs within the virtualized data layer network in accordance with embodiments of the present invention. For instance, in one example, an application executed on network node 100-3 can request data from network node 100-1 through a unicast communication. In response, using data stored within network node 100-3's control routing table, a data network PDU for the application can be generated by network node 100-3 that includes the request made by the application as well as header information that includes network node 100-1's virtual MAC address within the "destination" field and network node 100-3's virtual MAC address within the "source" field. Given that the data network PDU is being communicated via internal interface 101-3, the forwarding module of network node 100-3 (e.g., forwarding module 139) can format the data network PDU using an internal interface format and/or determine an egress port through hash calculations. Also, the forwarding module of network node 100-3 can also decrement the hop count of the data network PDU by 1.

Provided the hop count of the data network PDU is positive, the data network PDU can be communicated by the forwarding module of network node 100-3 to network node 100-2 using a selected egress port, where it can be received by network node 100-2's forwarding module. In this manner, the forwarding module of network node 100-2 can parse the header information of the data network PDU and compare the destination MAC address included within the header (e.g., network node 100-1's MAC address) to a list of destination MAC address stored within network node 100-2's forwarding table (e.g., forwarding table 107-2).

With further reference to FIG. 2B, network node 100-2 can perform a table lookup on forwarding table 107-2 and determine that the destination MAC address included within the header of the data network PDU received matches a virtual MAC address learned for network node 100-1. Additionally, given that the data network PDU is was received via internal interface 101-3 and destined for network node 100-1 via internal interface 101-4, the forwarding module of network node 100-2 can format the data network PDU using an internal interface format and/or determine an egress port through hash calculations. Furthermore, the forwarding module of network node 100-2 can also decrement the hop count of the data network PDU received by 1.

Provided the hop count of the data network PDU is a positive value, the forwarding module of network node 100-2 can forward the data network PDU to network node 100-1 via the selected egress port. Accordingly, network node 100-1 can receive and recognize the data network PDU and begin processing the request made by the application executed on network node 100-3.

Furthermore, network node 100-1 can communicate a response to the request issued by the application executed on network node 100-3. In one example, an application executed on network node 100-1 can respond to the request through a unicast communication response. As such, network node 100-1 can communicate a data network PDU that includes a response to the request as well as header information that includes network node 100-3's virtual MAC address within the "destination" field and network node 100-1's virtual MAC address within the "source" field. Additionally, given that the data network PDU is being communicated via internal interface 101-1, the forwarding module of network node 100-1 can format the data network PDU using an internal interface format and/or determine an egress port through hash calculations. Also, the forwarding module of network node 100-1 can also decrement the hop count of the data network PDU by 1.

Provided the hop count of the data network PDU is positive, the data network PDU can be communicated by the forwarding module of network node 100-1 to network node 100-2 using a selected egress port, where it can be received by network node 100-2's forwarding module. In this manner, the forwarding module of network node 100-2 can parse the header information of the data network PDU received and compare the destination MAC address included within the header (e.g., network node 100-3's MAC address) to a list of destination MAC address stored within network node 100-2's forwarding table (e.g., forwarding table 107-2).

With further reference to FIG. 2B, network node 100-2 can perform a table lookup on forwarding table 107-2 and determine that the destination MAC address included within the header of the data network PDU received matches a virtual MAC address learned for network node 100-3. Given that the data network PDU was received from network node 100-1 via internal interface 101-1 and destined for network node 100-3 via internal interface 101-2, the forwarding module of network node 100-2 can correspondingly format the data network PDU using an internal interface format and/or determine an egress port through hash calculations. Additionally, the forwarding module of network node 100-2 can also decrement the hop count of the data network PDU received by 1. Provided the hop count of the data network PDU is a positive value, the forwarding module of network node 100-2 can forward the data network PDU to network node 100-3 via the egress port selected where it can be ultimately consumed and processed by the application executed on network node 100-3.

Although FIG. 2B depicts 3 network nodes, embodiments of the present invention can support network configurations which can include more or less network nodes. Additionally, in one embodiment, control modules 138-1, 138-2 and/or 138-3 can be configured to use "age-out" procedures to remove MAC addresses that are inactive for a pre-determined period of time or any other procedures that can be used to dynamically maintain entries placed within control routing tables and/or forwarding tables. In this manner, all virtual MAC addresses of network nodes can be periodically refreshed by routing protocol and hence stay active as long as the network nodes are connected to the virtual network; the external MAC addresses learned on external interfaces can be aged out if there is no more Ethernet frames exchanged between the virtual network and the external device owning those external MAC addresses.

Figure 2C:
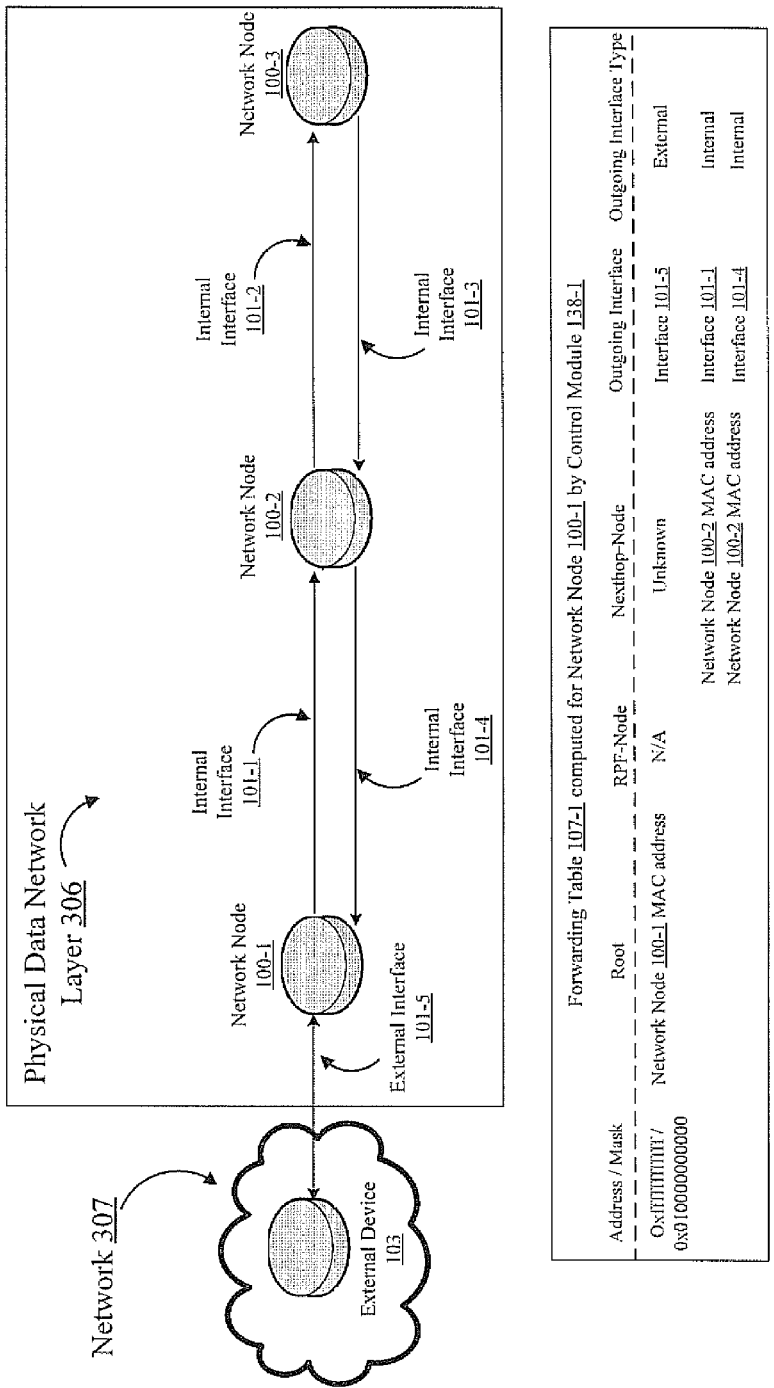
FIG. 2C depicts an exemplary multicast/broadcast MAC address forwarding table computed during a virtual layer 2 convergence state in accordance with embodiments of the present invention.

FIG. 2C depicts an exemplary multicast and/or broadcast forwarding table computed in accordance with embodiments of the present invention. As illustrated in FIG. 2C, external device 103 can be a computer system that is unassociated with physical data network layer 306 and can belong to a separate network (e.g., autonomous network system 307). Additionally, as described herein, the control modules of network nodes 100-1, 100-2 and 100-3 (e.g., control modules 138-1, 138-2, 138-3) can each generate and/or update local control routing topology databases responsive to determinations learned by their respective network node during LSA information exchanges and/or peering sessions performed with neighboring network nodes. The network nodes also exchange LSA information including multicast tree root election priority, based on the priorities and pre-defined algorithm a network node is elected as the tree root for multicast distribution tree. As such, using elected multicast tree root and the control routing topology database computed for their respective network nodes, control modules 138-1, 138-2, and 138-3 can each compute a corresponding multicast and/or broadcast forwarding table for use when processing inbound frames received by network nodes 100-1, 100-2 and 100-3, respectively.

For example, forwarding table 107-1 depicts an exemplary multicast and/or broadcast forwarding table computed by control module 138-1 for network node 100-1 which leverages control module 138-1's complete knowledge of the network routing topology associated with physical data network layer 306, and the elected multicast distribution tree root. As illustrated in FIG. 2C, network node 100-1 can be elected as the tree root based on priorities of network nodes 100-1, 100-2, and 100-3. Thus, all multicast and broadcast traffic within the virtual network can be distributed through network node 100-1. In this manner, a tree can be computed based on the elected tree root (e.g., network node 100-1) and topology information learned through LSA information exchanges. As such, this single distribution tree is a bidirectional tree which allows traffic to flow downwards as well as upwards the tree.

Figure 2D:
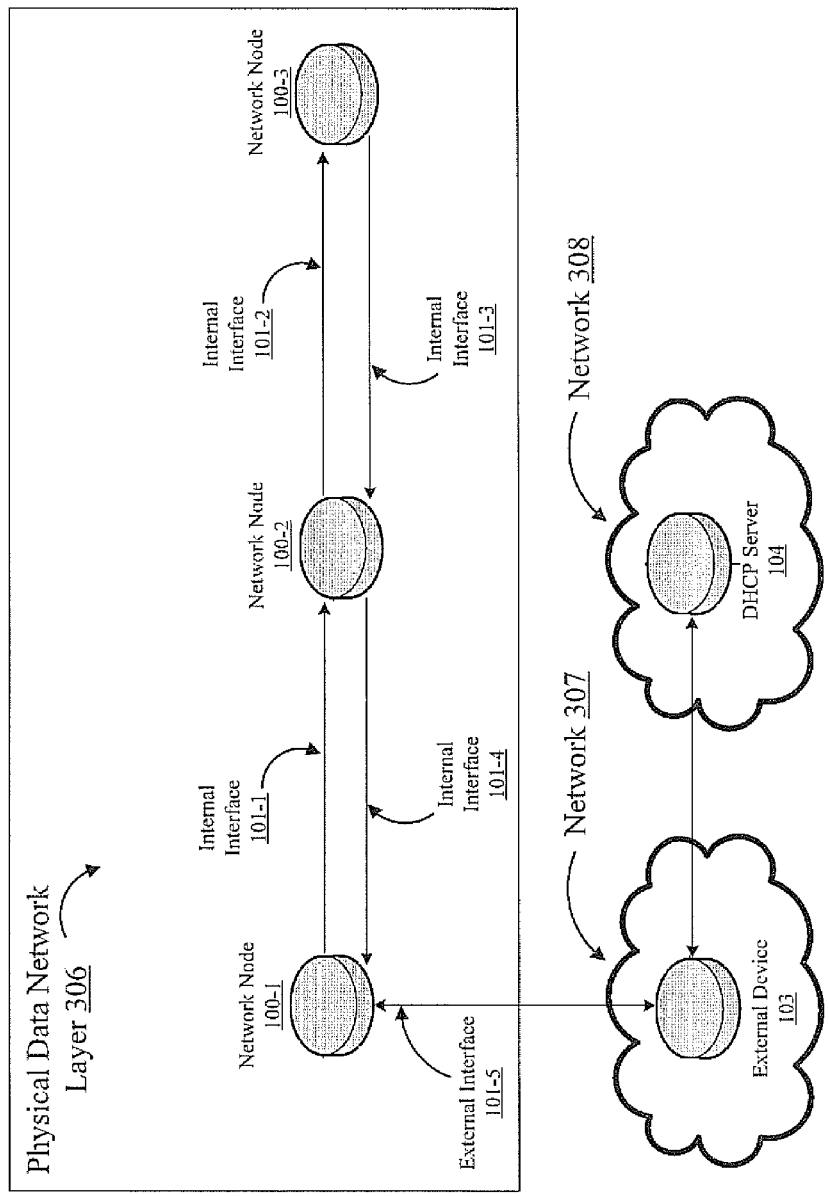
FIG. 2D depicts an automated virtual layer 2 interface generation process responsive to a virtual layer 2 convergence state in accordance with embodiments of the present invention.

FIG. 2D depicts an exemplary automated virtual layer 3 interface provisioning process in accordance with embodiments of the present invention. As illustrated in FIG. 2D, external device 103 and DHCP server 104 can be computer systems that are unassociated with physical data network layer 306 and can belong to separate networks (e.g., autonomous network systems 307 and 308). In one example, external device 103 and DHCP server 104 can part of the same network (e.g., same autonomous system). External device 103 can be a router that connects network node 100-1 and DHCP Server 104 with DHCP relay functionality; in this example external device 103 serves as a layer 2 switch which connects network node 100-1 and DHCP Server 104 in the same layer 2 broadcast domain. Additionally, DHCP server 104 can be a computer system (e.g., authoritative DHCP server) that can be capable of providing standard DHCP services to network nodes 100-1, 100-2 and 100-3 within physical data network layer 306.

With reference to the embodiment depicted in FIG. 2D, upon Layer 2 convergence of physical data network layer 306, Layer 3 interface module 147 network nodes 100-1, 100-2 and 100-3 can each be programmed to automatically create a virtual layer 3 interface that can be used by their respective virtual network management modules (e.g., virtual network management module 140) to communicate with the various network layers each node. For instance, a virtual network management module associated with network node 100-1 can generate a control network PDU (e.g. via services request generator 144) that includes a DHCP discovery message for the management interface.

As such, the control network PDU generated by the virtual network management module associated with network node 100-1 can also be configured to be broadcasted on a native VLAN configured for physical data network layer 306 through both internal and external interfaces learned by network node 100-1. In this manner, the virtual network management module can convert (e.g., Forwarding Module 139) the control network PDU to a conventional frame format (e.g., Ethernet II frame format) for broadcasts communicated via external interfaces so that can be recognizable to network devices outside of physical data network layer 306 (e.g., external device 103, DHCP server 104, etc.). Also, the virtual network management module can convert the control network PDU to an internal interface format for broadcasts communicated via internal interfaces so that can be recognizable to network devices within physical data network layer 306 (e.g., network nodes 100-2, 100-3, etc.) that can be capable of processing the request.

Accordingly, network nodes 100-2 and 100-3 can receive the control network PDU issued by network node 100-1 (e.g., via their respective layer 2 interfacing modules) through an inbound internal interface, which can be immediately processed by their respective management modules (e.g., virtual network management modules). Given their inability to provide the services requested by the control network PDU (e.g., they can be non-authoritative DHCP servers), network nodes 100-2 and 100-3 may not be able respond or can possibly ignore the control network PDU issued by network node 100-1.

In addition to network nodes 100-2 and 100-3, DHCP server 104 can also receive the control network PDU via external interface 101-5, which can be learned by network node 100-1 during a previous failed peering session between network node 100-1 and external device 103, and hence identified as an external interface. Given that the control network PDU was formatted with a conventional frame format for external interface 101-4, DHCP server 104 can recognize and process the DHCP Discovery message included within the control network PDU issued by network node 100-1.

DCHP server 104 can process the received DHCP Discovery message accordingly; assuming everything is alright and DHCP server 104 will respond with a DHCP Offer message. DHCP Server 104 allocates an IP address to associate with network node 100-1's virtual MAC which is contained in the DHCP Discovery message received; DHCP Server 104 creates a DHCP Offer message PDU with its own MAC as the source MAC and network node 100-1's virtual MAC as the destination MAC in the Ethernet frame, along with the allocated IP address and other fields properly populated in the DHCP Offer PDU. DCHP server 104 can send the DHCP Offer message to network node 100-1 via external interface 101-5 using a conventional frame format.

As such, upon receipt of the inbound frame by network node 100-1 via external interface 101-5, the virtual network management module associated with network node 100-1 can convert the inbound frame to an internal interface format that enables it to be processed by the virtual network management module (e.g., via network node 100-1's layer 3 interfacing module). Accordingly, DHCP server 104 and network node 100-1 can be engaged in an automated IP address provisioning process which can result in network node 100-1 receiving an IP address requested for the management interface created.

FIG. 2E depicts exemplary forwarding table computations performed subsequent to a virtual layer 2 convergence state responsive to a detection of a new MAC address in accordance with embodiments of the present invention. With reference to the embodiment depicted in FIG. 2D, FIG. 2E illustrates how the control modules of network nodes 100-2 and 100-3 (e.g., control modules 138-2 and 138-3) can update their local forwarding tables responsive to determinations learned by their respective network nodes during LSA information exchanges performed with network node 100-1.

For instance, subsequent to network node 100-1's learning of external interface 101-5 (see FIG. 2C), control modules 138-2 and 138-3 can update their local control routing tables to include the LSA information regarding external interface 101-5 learned by their network nodes during a periodic LSA information exchange with network node 100-1. When network node 100-1 receives a DHCP offer message on external interface 101-5, its forwarding module (e.g., forwarding module 139-1) detects that destination MAC is a known MAC contained in its unicast forwarding table, and the source MAC from DHCP server 104 is a new MAC address from outside the network, hence it notifies control module 138-1. Network node 1001-1's control module 138-1 creates a new LSA for this external MAC and floods it to all network nodes within the virtual network. As illustrated in FIG. 2D, in response to their topology updates, control modules 138-1, 138-2 and 138-3 on network nodes 100-1, 100-2 and 100-3 do a route computation and generate a new forwarding entry for external MAC from DHCP Server 104, and update their respective forwarding tables (e.g., forwarding tables 107-2 and 107-3) to include a destination MAC address learned for external device 104. In this manner, control modules 138-2 and 138-3 can also update their respective forwarding tables to also include external interface 101-5 and, thus, dynamically maintain the virtual layer 2 convergence state already obtained.

Accordingly, using a process similar to the one used by network node 100-1, network nodes 100-2 and 100-3 can be capable of separately requesting and receiving a respective IP address from DHCP server 104 in an automated manner for use in provisioning their own virtual layer 3 management interfaces, which they can have created for their respective virtual network management modules. Accordingly, physical data network layer 306 can be "virtualized" and bridged with an existing layer 3 infrastructure in a manner that that allows network nodes 100-1, 100-2, and 100-3 to utilize various applications and/or services that generally require an IP address for execution (e.g., SDN controller information services, SSH service, SNMP service, etc.).

Furthermore, FIG. 2E further illustrates how network nodes 100-1, 100-2 and/or 100-3 can also be capable of communicating and/or receiving data network PDUs through external interfaces in accordance with embodiments of the present invention. For instance, an application executed on network node 100-2 can request data from external device 104 through a unicast communication. As such, using data stored within network node 100-2's control routing table, a data network PDU for the application can be generated by network node 100-2 that includes the request made by the application as well as header information that includes external device 104's MAC address within the "destination" field and network node 100-2's virtual MAC address within the "source" field. Additionally, given that the data network PDU is being communicated via internal interface 101-4, the forwarding module of network node 100-2 can format the data network PDU using an internal interface format and/or determine an egress port through hash calculations. Also, the forwarding module of network node 100-2 can also set the hop count of the data network PDU to a pre-determined maximum value.

Provided the hop count of the data network PDU is positive, the data network PDU can be communicated by the forwarding module of network node 100-2 to network node 100-1 using a selected egress port, where it can be received by network node 100-1's forwarding module. In this manner, the forwarding module of network node 100-1 can parse the header information of the data network PDU and compare the destination MAC address included within the header (e.g., external device 104's MAC address) to a list of destination MAC address stored within network node 100-1's forwarding table (e.g., forwarding table 107-1).

With further reference to FIG. 2E, network node 100-1 can perform a table lookup on forwarding table 107-1 and determine that the destination MAC address included within the header of the data network PDU received matches a destination MAC address learned for external device 104. Given that the data network PDU was received from network node 100-2 via internal interface 101-4 and destined for external device 104 via external interface 101-5, the forwarding module of network node 100-1 can automatically convert the inbound data network PDU received to an external interface format prior to forwarding the data network PDU to external device 104. Accordingly, external device 104 can receive and recognize the converted data network PDU and begin processing the request made by the application associated within network node 100-2.

External device 104 can communicate a response to the request issued by the application executed on network node 100-2. An application executed on external device 104 can respond to the request through a unicast communication response. As such, external device 104 can communicate a frame that includes a response to the request as well as header information that includes network node 100-2's virtual MAC address within the "destination" field and external device 104's MAC address within the "source" field. The frame issued by external device 104 can be formatted using a conventional frame format (e.g., Ethernet II frame format) prior to being communicated to network node 100-1 via external interface 101-5.

Upon receipt of the frame via external interface 101-5, the forwarding module of network node 100-1 can parse the header information of the frame and compare the destination MAC address included within the header (e.g., network node 100-2's virtual MAC address) to a list of destination MAC address stored within network node 100-1's forwarding table (e.g., forwarding table 107-1). As such, network node 100-1 can perform a table lookup on forwarding table 107-1 and determine that the destination MAC address included within the header of the frame received matches a virtual MAC address learned for network node 100-2.

Additionally, given that the frame was received from external device 103 via external interface 101-5 and destined for network node 100-2 via internal interface 101-1, the forwarding module of network node 100-1 can automatically convert the inbound frame received to an internal interface format and/or determine an egress port through hash calculations. Also, the forwarding module of network node 100-1 can also set the hop count of the data network PDU to a pre-determined maximum value.

Provided the hop count of the data network PDU is positive, the data network PDU can be communicated by the forwarding module of network node 100-1 to network node 100-2 using a selected egress port, where it can be ultimately consumed and processed by the application executed on network node 100-2.

Figure 3:
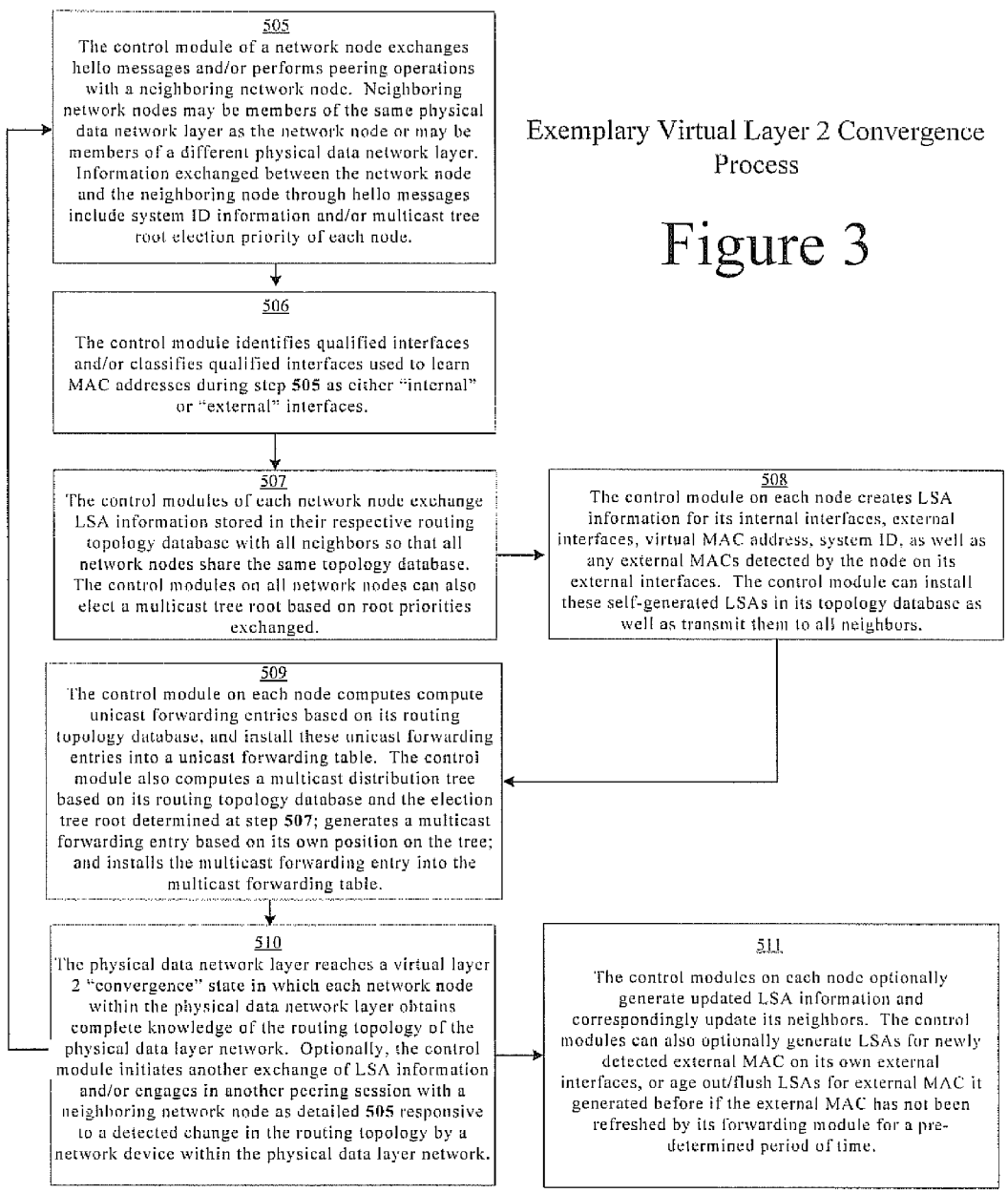
FIG. 3 shows a flowchart of an exemplary computer controlled process for generating a virtual layer 2 convergence state in accordance with embodiments of the present invention.

FIG. 3 is a flowchart of an exemplary computer-implemented method for generating a virtual layer 2 convergence state in accordance with embodiments of the present invention.

At step 505, the control module of the network node exchanges hello messages and/or performs peering operations with a neighboring network node. Neighboring network nodes can be members of the same physical data network layer as the network node or can be members of a different physical data network layer. Information exchanged between the network node and a neighboring network node through hello messages includes system ID, multicast tree root election priority of each node.

At step 506, the control module of the network node identifies qualified interfaces and/or classifies qualified interfaces used to learn MAC addresses during step 505 as either "internal" or "external" interfaces.

At step 507, the control modules of each network node exchange LSA information stored in their respective routing topology database with all neighbors so that all network nodes share the same topology database. The control modules on all network nodes can also elect a multicast tree root based on root priorities exchanged.

At step 508, the control module on each node creates LSA information for its internal interfaces, external interfaces, virtual MAC address, system ID, as well as any external MACs detected by the node on its external interfaces. The control module can install these self-generated LSAs in its topology database as well as transmit them to all neighbors.

At step 509, the control module on each node computes compute unicast forwarding entries based on its routing topology database, and install these unicast forwarding entries into a unicast forwarding table. The control module also computes a multicast distribution tree based on its routing topology database and the election tree root determined at step 507; generates a multicast forwarding entry based on its own position on the tree; and installs the multicast forwarding entry into the multicast forwarding table.

At step 510, the physical data network layer reaches a virtual layer 2 "convergence" state in which each network node within the physical data network layer obtains complete knowledge of the routing topology of the physical data layer network. Optionally, the control module initiates another exchange of LSA information and/or engages in another peering session with a neighboring network node as detailed 505 responsive to a detected change in the routing topology by a network device within the physical data layer network.

At step 511, the control modules on each node optionally generate updated LSA information and correspondingly update its neighbors. The control modules can also optionally generate LSAs for newly detected external MAC on its own external interfaces, or age out/flush LSAs for external MAC it generated before if the external MAC has not been refreshed by its forwarding module for a pre-determined period of time.

Figure 4A:
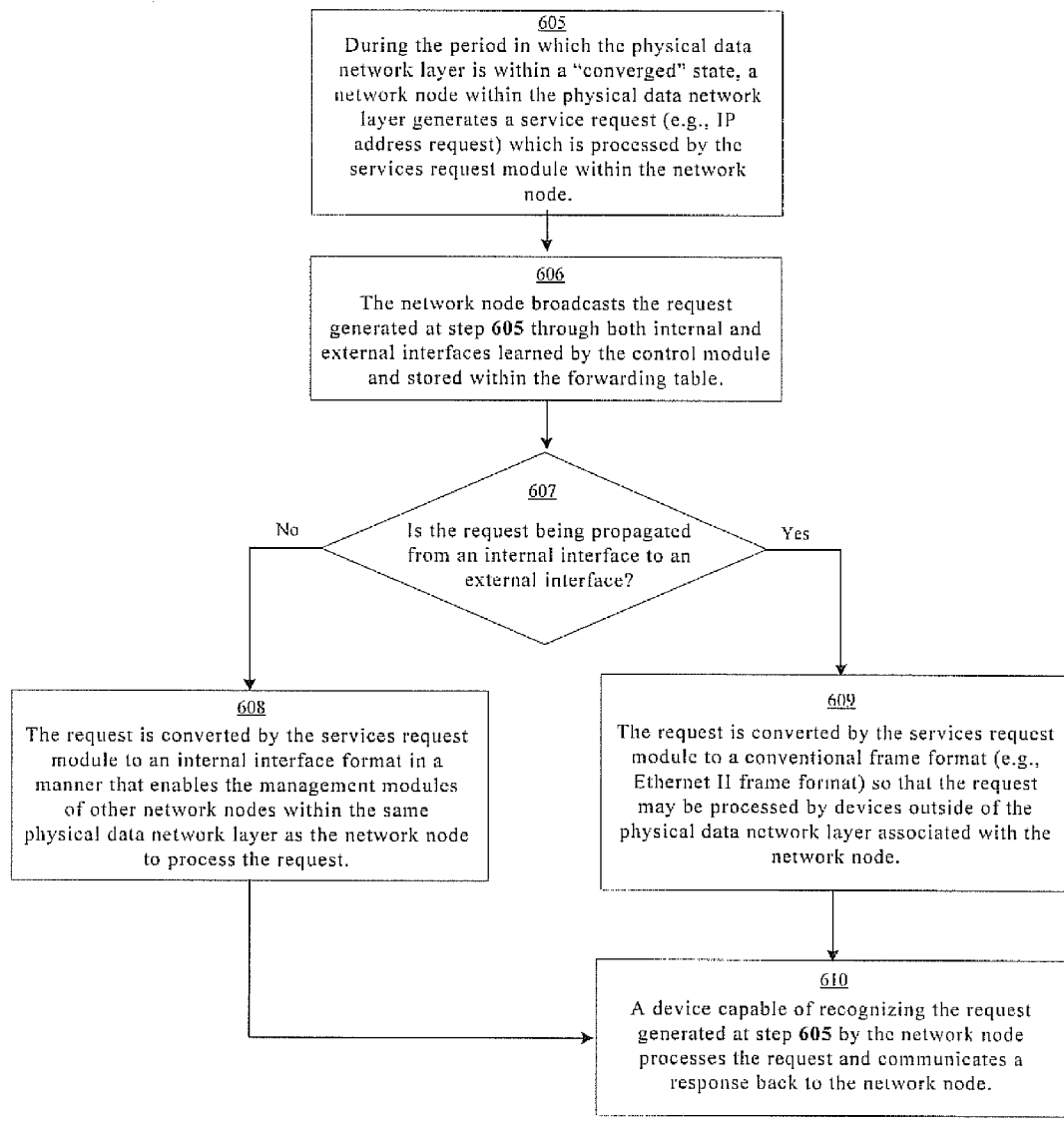
FIG. 4A shows a flowchart of an exemplary computer controlled process for generating a virtual layer 2 interface responsive to a virtual layer 2 convergence state in accordance with embodiments of the present invention.

FIG. 4A is a flowchart of an exemplary computer-implemented method of generating a service request within a virtualized Layer 2 network in accordance with embodiments of the present invention. The details of operation 510 (see FIG. 3) are outlined in FIG. 4A.

At step 605, during a period in which the physical data network layer is within a "converged" state, a network node within the physical data network layer generates a service request (e.g., IP address request) which is processed by the services request module within the network node.

At step 606, the network node broadcasts the request generated at step 605 through both internal and external interfaces learned by the control module and stored within the forwarding table.

At step 607, a determination is made as to whether the request is being propagated from an internal interface to an external interface. If the request is not being propagated from an internal interface to an external interface, then the request is converted by the services request module to an internal interface format in a manner that enables the management modules of other network nodes within the same physical data network layer as the network node to process the request, as detailed in step 608. If the request is being propagated from an internal interface to an external interface, then the request is converted by the services request module to a conventional frame format (e.g., Ethernet II frame format) so that the request can be processed by devices outside of the physical data network layer associated with the network node, as detailed in step 609.

At step 608, the request is not being propagated from an internal interface to an external interface and, therefore, the request is converted by the services request module to an internal interface format in a manner that enables the management modules of other network nodes within the same physical data network layer as the network node to process the request.

At step 609, the request is being propagated from an internal interface to an external interface and, therefore, request is converted by the services request module to a conventional frame format (e.g., Ethernet II frame format) so that the request can be processed by devices outside of the physical data network layer associated with the network node.

At step 610, A device capable of recognizing the request generated at step 605 by the network node processes the request and communicates a response back to the network node.

FIG. 4B is a flowchart of an exemplary computer-implemented method of generating a virtual layer 2 interface in an automated manner in accordance with embodiments of the present invention. The details of operation 610 (see FIG. 4A) are outlined in FIG. 4B.

At step 705, a DHCP server capable of recognizing and processing a request (e.g., IP address request) generated by the network node receives a request and generates a response. The response is then communicated back to the network node.

At step 706, a determination is made as to whether the response is formatted with a standard Ethernet II frame format that is recognizable to the network node. If the response is formatted with a standard Ethernet II frame format that is recognizable to the network node, then the response format is recognizable to the virtual network management module of the network node. As such, the response is not converted by the forwarding module which allows the virtual network management module to consume and process the response produced at step 705, as detailed in step 707. If the response is not formatted with a standard Ethernet II frame format that is recognizable to the network node, then the response is converted by the forwarding module to a standard Ethernet II frame format that is recognizable to the virtual network management module of the network node. As such, the virtual network management module is able to consume and process the response produced at step 705, as detailed in step 708.

At step 707, the response is formatted with a standard Ethernet II frame format that is recognizable to the network node and, therefore, the response format is recognizable to the virtual network management module of the network node. As such, the response is not converted by the forwarding module which allows the virtual network management module to consume and process the response produced at step 705.

At step 708, the response is not formatted with a standard Ethernet II frame format that is recognizable to the network node and, therefore, the response is converted by the forwarding module to a standard Ethernet II frame format that is recognizable to the virtual network management module of the network node. As such, the virtual network management module is able to consume and process the response produced at step 705.

At step 709, responsive to processing the response produced at step 705, the network node receives a reply message from the DHCP server, and continues with an IP address provisioning process to bind an IP address within a virtual layer 3 interface created by the network node.

At step 710, after successfully completing the IP address provisioning process, the network successfully acquires an IP address, and subsequently binds the acquired IP address with a virtual layer 3 interface created earlier. The virtual layer 3 interface can be able to interface with the various different networking layers associated with the network node (e.g., Layer 3 network) and provide IP packet I/O functionalities for networking layers and applications using the network layers.

While the foregoing disclosure sets forth various embodiments using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various embodiments have been described and/or illustrated herein in the context of fully functional computing systems, one or more of these example embodiments can be distributed as a program product in a variety of forms, regardless of the particular type of computer-readable media used to actually carry out the distribution. The embodiments disclosed herein can also be implemented using software modules that perform certain tasks. These software modules can include script, batch, or other executable files that can be stored on a computer-readable storage medium or in a computing system. These software modules can configure a computing system to perform one or more of the example embodiments disclosed herein. One or more of the software modules disclosed herein can be implemented in a cloud computing environment. Cloud computing environments can provide various services and applications via the Internet. These cloud-based services (e.g., software as a service, platform as a service, infrastructure as a service, etc.) can be accessible through a Web browser or other remote interface. Various functions described herein can be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as can be suited to the particular use contemplated.

What is claimed is:

1. A method of generating a virtual interface for a physical data network layer, said method comprising:
    using a first network device, communicating with a second network device within a same physical data network layer to learn a network routing topology associated with said physical data network layer, wherein said physical data network layer reaches a logical convergence state;
    exchanging a set of learned MAC addresses between said first and second network devices;
    populating a forwarding table using said set of learned MAC addresses, wherein said set of learned MAC addresses comprises an external MAC address associated with a different physical data network layer;
    communicating a request for an IP address using said external MAC address; and
    generating a virtual interface for said physical data network layer, wherein said first network device is operable to use said virtual interface for communicating data to said different physical data network layer, wherein said communicating a request further comprises converting said request to a format recognizable to an external device operable to process said request, wherein said external device belongs to said different physical data network layer.

2. The method as described in claim 1, wherein said communicating further comprises using a network routing protocol to communicate with said second network device.

3. The method as described in claim 1, wherein said forwarding table is a unicast forwarding table.

4. The method as described in claim 1, wherein said external device is a DHCP server.

5. The method as described in claim 1, wherein said generating a virtual interface further comprises converting a response received responsive to said request for said IP address to a format recognizable to said first network device.

6. The method as described in claim 1, wherein said first network device is a network switch.

7. An apparatus for generating a virtual interface for a physical data network layer, said system comprising:
    a memory storing a forwarding table;
    a network interface; and
    a processor coupled to the memory and network interface that communicates with a different network device within said physical data network layer using said network interface to learn a network routing topology associated with said physical data network layer, populates said forwarding table using a set of learned MAC addresses comprising an external MAC address associated with a different physical data network layer, communicates a request for an IP address for said system using said external MAC address and said network interface, and automatically generates a virtual interface for said physical data network layer, provided said system receives said IP address, wherein said network interface is operable to use said virtual interface for communicating data to said different physical network layer, wherein said physical data network layer reaches a logical convergence state and said network interface and said different network device exchange the set of learned MAC addresses, wherein said processor converts said request to a format recognizable to an external device operable to process said request, wherein said external device belongs to said different physical data network layer than said system.

8. The apparatus as described in claim 7, wherein said network interface uses a network routing protocol to communicate with said different network device.

9. The apparatus as described in claim 7, wherein said forwarding table is a unicast forwarding table.

10. The apparatus as described in claim 7, wherein said external device is a DHCP server.

11. The apparatus as described in claim 7, wherein said processor further operable to convert a response received responsive to said request for said IP address to a format recognizable to said system.

12. The apparatus as described in claim 7, wherein said physical data network layer comprises a star network topology.

13. A method of bridging a virtual layer 2 network to a layer 3 network, said method comprising:
    communicating between a first network switch and a second network switch within a same layer 2 network to learn a network routing topology associated with said layer 2 network, wherein said layer 2 network reaches a logical convergence state to produce a virtual layer 2 network;
    exchanging a set of learned MAC addresses between said first network switch and said second network switch;
    populating a forwarding table using said set of learned MAC addresses, wherein said set of learned MAC addresses comprises an external MAC address associated with a different layer 2 network;
    communicating a request for an IP address for said network switch using said external MAC address; and
    provided said network switch receives said IP address, automatically bridging said virtual layer 2 network to a layer 3 network, wherein said network switch is operable to communicate data from said virtual layer 2 network to said layer 3 network responsive to said bridging, wherein said communicating a request further comprises converting said request to a format recognizable to an external device operable to process said request, wherein said external device belongs to said different layer 2 network.

14. The method as described in claim 13, wherein said communicating further comprises using a network routing protocol to communicate with said different network switch.

15. The method as described in claim 13, wherein said forwarding table is a unicast forwarding table.

16. The method as described in claim 13, wherein said external device is a DHCP server.

17. The method as described in claim 13, wherein said bridging further comprises converting a response received responsive to said request for said IP address to a format recognizable to said network switch.

18. The method as described in claim 13, wherein said layer 2 network comprises a bus network topology.

\* \* \* \* \*